April 18, 1967 R. H. KATZENBERGER ETAL 3,314,304
SERIES COMPOUND TORSIONAL VIBRATION DAMPER
Filed Feb. 12, 1965 2 Sheets-Sheet 1

INVENTORS.
RALPH H. KATZENBERGER,
SANFORD A. McGAVERN, JR.
and HARNEK SINGH GILL
BY Lockwood, Woodard, Smith & Weikart
Attorneys

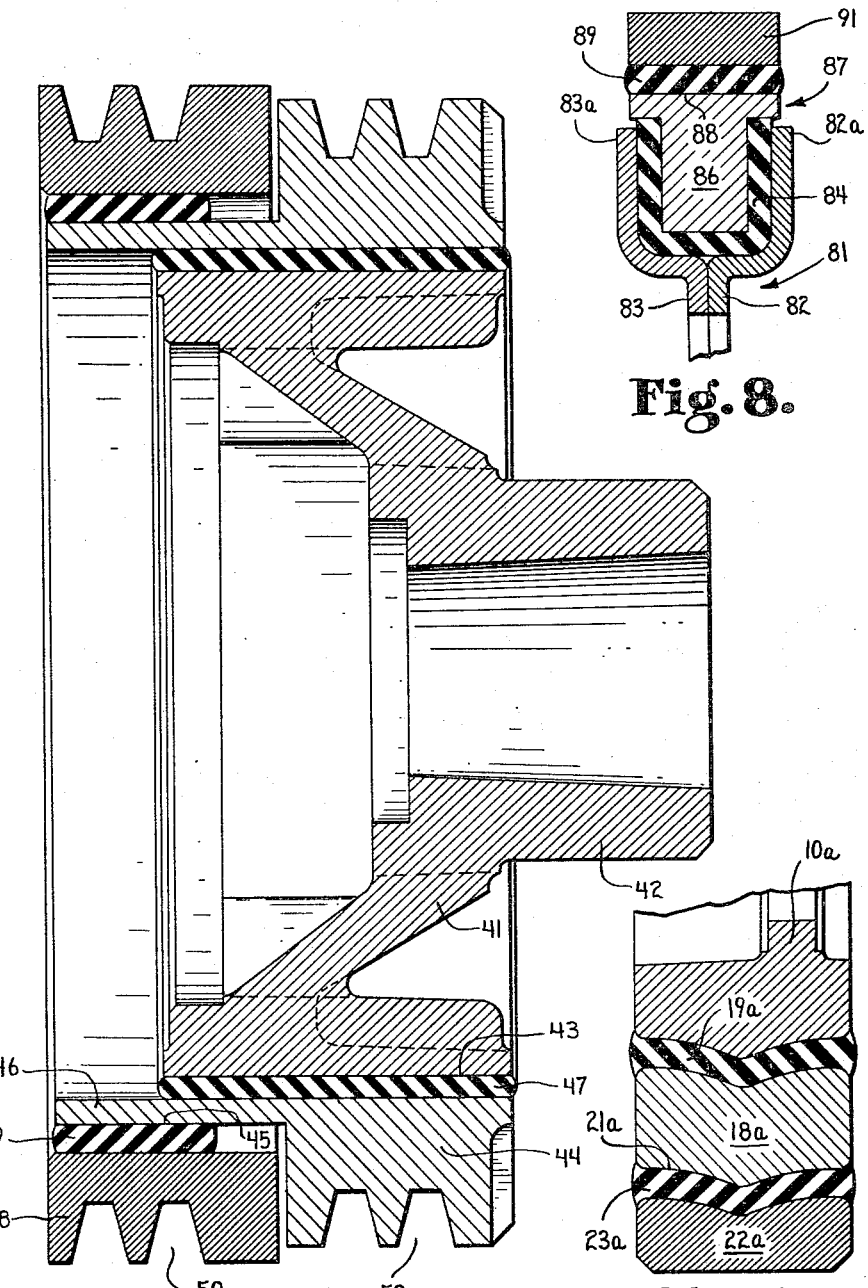

3,314,304
SERIES COMPOUND TORSIONAL
VIBRATION DAMPER
Ralph H. Katzenberger, Sanford A. McGavern, Jr., and Harnek Singh Gill, Indianapolis, Ind., assignors to Wallace-Murray Corporation, a corporation of Delaware
Filed Feb. 12, 1965, Ser. No. 432,081
7 Claims. (Cl. 74—574)

This invention relates generally to torsional vibration dampers and in particular to dampers for effectively damping torsional vibration of the crankshafts of modern high power, and/or high speed internal combustion engines.

Rotating shafts, such as the crankshaft of an internal combustion engine, are subject to torsional vibration because of the cyclic forces applied to them during rotation. In the case of an internal combustion engine, the engine crankshaft and associated parts such as the flywheel form a mass elastic system having a relatively low natural frequency, of the order of 10,000 to 20,000 cycles per minute (c.p.m.) in a six cylinder engine. A multiple-throw crankshaft, since a number of inertia masses are distributed along its length and vibration-inducing impulses are applied to all of the crank units, can vibrate in a number of different ways. The most important is the first mode of vibration, when there is a single nodal point, usually at the end of the engine near the flywheel.

It is well known in the art to apply a tuned, dynamic damper to the engine crankshaft near the point of maximum vibration amplitude in the mass elastic system, usually at the front end of the crankshaft. Such dampers generally comprise an inertia mass secured resiliently to the shaft and rotated with the shaft. The magnitude of the mass and the resilience of its connection to the shaft are chosen so that the damper has a natural frequency which is approximately 75 percent of the engine frequency without the damper.

The presence of such a damper (usually taking the form of an annular mass or inertia member adhered to an annular elastic or rubber member which, in turn, is adhered to a mounting hub) in the system introduces a second mode of vibration to the mass elastic system, with a second node point near the damper, that is, near the front end of the crankshaft. Thus, in a typical six cylinder engine having a natural frequency without the damper of 10,000 c.p.m. as mentioned above, the natural frequency of the first mode of vibration is depressed to, for example, approximately 7500 c.p.m. when the damper is present. In addition, a fundamental frequency for the second mode of vibration is created at a frequency above the original 10,000 c.p.m., at approximately 12,500 c.p.m. for example. Any tuned damper connected to the crankshaft of an engine so as to lower the fundamental frequency of the first mode of torsional vibration of the engine elastic system also introduces a second mode of vibration which possibly might occur in the operating speed range of the engine. In the conventional low speed, low power engines of the past, however, the major orders of vibration of the second mode were outside the engine operating speed range and therefore could be ignored.

With the advent of high power and/or high speed engines, the second mode major orders of vibration, with high vibration amplitudes and stresses, can be encountered within the engine operating speed range. In the past, attempts have been made to meet this difficulty by providing a second damper, including a mass and an elastic connection to the crankshaft, in parallel with the first damper. Such structures are disclosed in U.S. Patents 2,477,081 and 3,126,760. This second damper, tuned to damp out the second mode vibration, introduces a third mode of vibration to the mass elastic system. For high speed engines the major orders of even this third mode of vibration may be encountered well within the engine operating speed range. Further, there usually is insufficient space at the front of a vehicle-installed engine to accommodate the relatively bulky double, parallel damper.

The concept of the present invention utilizes a multiple, such as a dual, damper but with the inertia elements elastically connected *in series*, rather than in parallel as in prior art constructions. This arrangement, as in the parallel connected structures, results in three primary vibration modes, but by proper selection of the inertia ratio and spring, or elastic member, stiffnesses the major orders of vibration of the third mode (the one in which the highest stresses occur) can be displaced well out of the engine operating speed range.

A further primary advantage in this multiple series damper arrangement is that, when the two series connected damper components are properly tuned, the torques applied to the dampers at resonance are significantly reduced. The torsional stress in the damper, that is the stress in the elastic elements and at their areas of adherence with adjacent surfaces is greatly reduced and their operating life is thereby prolonged. Since the dampers are in series, in each vibration mode each of the two inertia members or masses are moving out of phase with each other and out of phase with the shaft-connecting hub. Due to amplification through the first damper, comparatively larger relative amplitude is obtained in the second damper and hence more vibratory energy may be converted into heat than with either a single or parallel-double damper. The thermal energy generated per unit volume of the elastic material (rubber) is greatly reduced and this further prolongs the service life of the damper when compared to a conventional single damper.

The object of the present invention is, therefore, to provide a compound, series-connected torsional vibration damper particularly adapted for use with shafts subject to forced torsional vibration such as high power, and/or high speed internal combustion engine crankshafts.

These and other objects will become apparent as the description proceeds with reference to the accompanying drawings in which:

FIG. 3 is a similar side sectional view but showing a modified form of the damper.

FIG. 7 is a fragmentary, side sectional view of a still further modified form of the damper.

FIG. 8 is a fragmentary, side sectional view showing a still further modified form of the damper.

Figure 1:
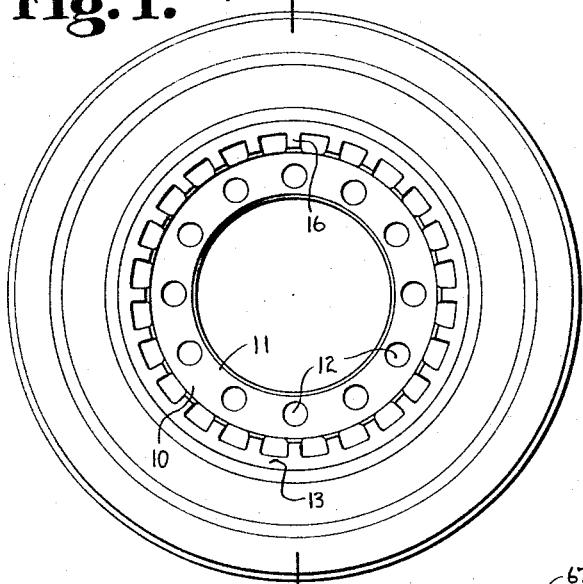
FIG. 1 is a front plan view of a torsional vibration damper embodying the present invention.
Figure 2:
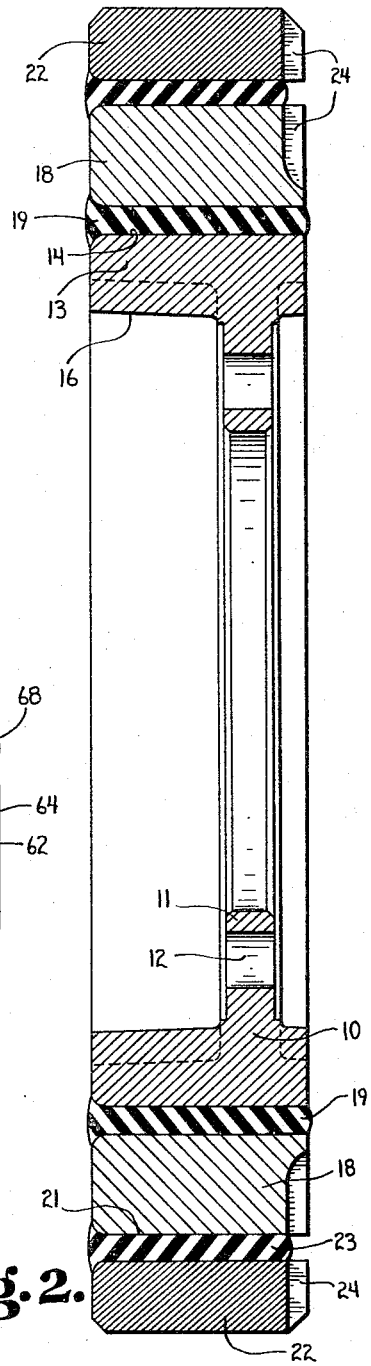
FIG. 2 is a side sectional view taken generally along the line 2—2 of FIG. 1.

Referring initially to FIGS. 1 and 2, the assembly embodying the present invention comprises a generally annular shaped driving member 10. The driving member has a radially inwardly extending portion 11 which is adapted to be mounted on a hub, accessory drive pulley (not shown), or similar means conventionally associated with rotating machinery subject to torsional vibrations such as the crankshaft of a reciprocating, internal combustion engine. The inwardly extending portion 11 may be provided with a plurality of apertures 12 to receive bolts for mounting the driving member to a hub, accessory drive pulley or the like. The driving member 10 is further provided with a sidewardly extending flange portion 13 which has a cylindrical peripheral surface 14. The radiating fins 16 and 17 extending from the front and rear faces of the driving member, increase the surface area of the member and aid in the dissipation of heat from the member and the elastic elements.

Disposed concentrically with the driving member 10 is a first driven inertia member 18. This inertia member encircles the surface 14 of the driving member and interposed therebetween is an elastic means which comprises an annular elastic element 19. It will be understood that the element 19 provides the elastic connection between the mass provided by the inertia member 18 and the driving member 10. The element 19 may be formed of rubber or any other suitable elastomer. The elastic element or band may be inserted into the space between the driving and driven members either prior to or after curing. The element may be in a state of radial compression in the assembly, and a suitable bonding agent may be applied between the elastic element and the driving and driven members, depending upon the mode of manufacture used and the operational conditions. The material forming the elastic element 19 is selected so that it has physical properties which provide the desired natural frequency and high hysteresis required for the damper.

The driven inertia member 18 is provided with a circular, outer surface 21 and encircling this surface but spaced therefrom is a further driven inertia member 22. Interposed between the surface 21 and the adjacent surface of the inertia member 22 is a second elastic means, taking the form of the elastic member 23. This elastic member 23 is formed and inserted into the assembly similarly to the elastic member 19 previously described. The driven inertia members 18 and 22 are provided with integral cooling fins 24 for aiding in the dissipation of heat from the assembly.

From the foregoing, it will be recognized that the assembly provides a compound, series-connected torsionally resilient system for attachment to the rotating drive shaft. The inertia member 22 is connected in series with the inertia member 18 through the elastic element 23 and this system is then connected elastically to the drive shaft through the elastic member 19 and the driving member 10. By proper selection of the inertia ratio and the resiliency of the elastic members, stress levels can be reduced to acceptable values.

Referring now to FIG. 3, a modified form of the structure is shown in which the primary concept, the series connection of the compound damper is retained but the relative placement of the first and second inertia members is varied somewhat from their relative positions in the structure of FIGS. 1 and 2. In this arrangement, the driving member 41 is provided with a hub portion 42 adapted to accommodate a shaft subject to torsional vibration such as the crankshaft of a rotating, internal combustion engine. The peripheral surface 43 of the driving member is cylindrical in configuration. Enclosing this surface, and spaced therefrom, is a driven inertia member 44 having a sidewardly extending flange portion 46. The inertia members 44 and 48 can be machined to provide belt grooves 50 for driving a fan or other accessory equipment.

Interposed between the inertia member 44 and the driving member 41 is an elastic means taking the form of the elastic band 47. The band 47 may be formed and inserted between the driving and driven members in the same fashion as the bands 19 and 23, referred to previously with reference to FIG. 2. The sidewardly extending flange portion 46 of the driven member 44 has a circular surface 45 which is encircled by an annular driven inertia member 48. Interposed between the inertia member 48 and the surface 45 is a further elastic means taking the form of the elastic band 49. The band 49 is formed and deposited in place in the same fashion as the band 47.

It will be evident that the structure of FIG. 3 provides two separate inertia element systems which are connected in series to the driving member 41. The action of the structure is precisely the same as that of FIG. 2 but can be used where space measured radially outwardly of the axis of the shaft is limited and space parallel to the axis of the shaft is available.

Figure 4:
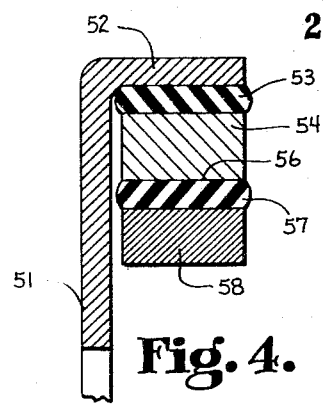
FIG. 4 is a fragmentary, side sectional view of a further modified form of the damper.

Referring to FIG. 4, a further modification of the structure is shown in which the driving member 51 has a sidewardly extending flange 52. A first elastic element 53 is interposed between the inner surface of the flange 52 and the adjacent surface of a first driven inertia member 54. The circular surface 56 on the inertia member 54 accommodates a second elastic element 57 which is interposed between the surface 56 and a second driven inertia member 58. The structure is identical in fundamental principal of operation to those already described and differs primarily in that the diameter of the second driven inertia member 58 is smaller than the diameter of the first inertia member 54. This configuration tends to accommodate lower spring rates in the second damper.

Figure 5:
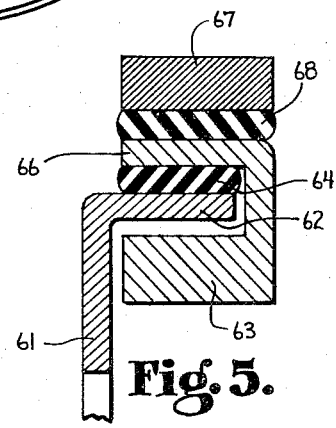
FIG. 5 is a fragmentary, side sectional view of a still further modified form of the damper.

Referring to FIG. 5, the driving member 61 is provided with a sidewardly extending flange portion 62. The driven inertia member 63 is generally U-shaped in cross-section and the elastic element 64 is interposed between the outer surface of the flange portion 62 and the adjacent surface of the extending portion 66 of the inertia member 63. The extending portion 66 of the inertia member 63 has a cylindrical, peripheral surface which is encircled by the annular inertia member 67. An elastic element 68 is interposed between the inertia member portion 66 and the inertia member 67. The driven inertia members are connected in series through the elastic elements 64 and 68 to the driven member 61.

Figure 6:
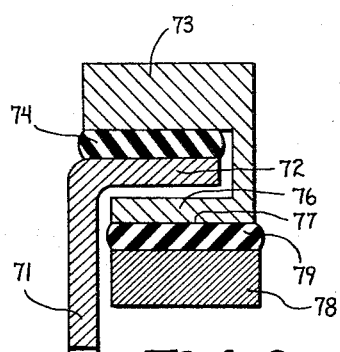
FIG. 6 is a fragmentary, side sectional view of a still further modified form of the damper.

Referring to FIG. 6, in this form of the structure, the driven member 71 has a sidewardly extending, flange portion 72 whose peripheral surface is enclosed by a driven inertia member 73. An elastic element 74 is interposed between the adjacent surfaces of the inertia member 73 and the driving member 72. A depending flanged portion 76 of the inertia member 73 presents a circular surface 77 to a second, annular driven inertia member 78. Interposed between the surface 77 and the inertia member 78 is an elastic element 79.

FIG. 7 discloses a damper similar to that shown in FIG. 2 and parts of the structure of FIG. 7 which correspond to parts shown in FIG. 2 are given the same reference numerals as in FIG. 2 but with the suffix "*a*." The structure of FIG. 7 differs from that of FIG. 2 in that the driving member 10a and the inertia members 18a and 22a are formed so that the elastic elements 19a and 23a assume a "gull wing" configuration when in place in the assembly. The surface 21a is concentric about the axis of rotation of the driving member 10a but is not a cylindrical surface as is the surface 21 of FIG. 2. This "gull-wing" configuration has advantages disclosed and claimed in U.S. Patent 2,992,569, assigned to the assignee of the present invention.

FIG. 8 shows a damper structure in which the driving member 81 is composed of two attached plates 82 and 83. The plates are flanged axially away from each other and their peripheral margins 82a and 83a are thereby spaced from each other to provide an annular recess. Inserted in the recess is a generally U-shaped, first elastic element 84 and within the bight of element 84 is the extending leg 86 of a generally T-shaped inertia member 87. The cylindrical surface 88 on the inertia member 87 accommodates a second elastic element 89 which is interposed between the surface 88 and a second driven inertia member 91. The structure is identical in fundamental principle of operation to those already described and differs primarily in that the driving member 81 has a peripheral recess receiving a radially inward extending leg 86 of the first inertia member 87 with the elastic element 84 lining the base and sides of the recess.

It will be evident that the various forms of the structure shown provide for placement of either one of the driven inertia members at various radial distances from the axis of rotation of the shaft upon which the damper is installed, and therefore provides a means for varying the characteristics of the damper in addition to permitting it to be accommodated in variously shaped, limited spaces. In addition to the improved vibration damping characteristic previously referred to, the structure of the present invention is characterized by a simplicity of design and ease of handling as compared to two single dampers. No special machining or assembling apparatus is necessary for forming the dampers and an almost infinite number of combinations of inertia masses and elastic element resiliencies can be formed thus permitting tailoring of the damper to a wide range of systems subject to torsional vibration.

While the invention has been disclosed and described in some detail in the drawings and foregoing description, they are to be considered as illustrative and not restrictive in character, as modifications may readily suggest themselves to persons skilled in this art and within the broad scope of the invention, reference being made to the appended claims.

What is claimed is:

1. A torsional vibration damper assembly for mounting in operative relation to a torsionally vibrating rotating shaft comprising a driving member adapted for rotation by said rotating shaft, said driving member having a surface concentric with the axis of rotation of said rotating shaft, a first driven inertia member mounted concentrically of said driving member and encircling said concentric surface thereof, first elastic means interposed between said driving and driven members prohibiting permanent displacement of the driven member with relation to the driving member, a second driven inertia member mounted concentrically of said driving member, and second elastic means interposed as the sole physical connection between said first and second driven inertia members and preventing permanent displacement of said second driven member with relation to said first driven member, whereby the elastic systems formed by paired driven members and elastic means are series connected.

2. A torsional vibration damper assembly for mounting in operative relation to a shaft subject to torsional vibrations comprising a driving member adapted for rotation by an engine crankshaft, a first driven inertia member mounted concentrically of and encircling said driving member, first elastic means interposed between said driving and driven members prohibiting permanent displacement of the driven member with relation to the driving member, a second driven inertia member mounted concentrically of said driving member, and second elastic means interposed as the sole physical connection between said first and second driven inertia members and preventing permanent displacement of said second driven member with relation to said first driven member, whereby the elastic systems formed by paired driven members, and elastic means are series connected.

3. A torsional vibration damper assembly for mounting in operative relation to the crankshaft of an internal combustion engine comprising a generally annular driving member adapted for concentric attachment to a crankshaft and having an axially extending peripheral flange, a first driven inertia member mounted concentrically of said driving member and having a central aperture therein accommodating said driving member flange, a first annular elastic element interposed between said driving and driven members prohibiting permanent displacement of the driven member with relation to the driving member, said driven member having a surface thereon concentric with the axis of rotation of said driving member, a second driven inertia member mounted concentrically of said first driven member and having a central aperture therein accommodating said concentric surface of said first driven member, and a second annular elastic member interposed between said second driven member and said concentric surface of said first driven member preventing permanent displacement of said second driven member with relation to said first driven member, whereby the elastic system formed by paired driven members and elastic elements are series connected.

4. A torsional vibration damper as claimed in claim 3 having said elastic elements and said driven inertia members all disposed radially inboard of the peripheral flange surface of said driving member.

5. A torsional vibration damper as claimed in claim 3 having a portion of said first driven member disposed radially inboard of the peripheral flange surface of said driving member.

6. A torsional vibration damper as claimed in claim 3 having said first elastic element and a portion of said first driven member disposed radially outboard of the peripheral flange surface of said driven member, said concentric surface of said first driven member, said second elastic element and said second driven member all being disposed radially inboard of the peripheral flange surface of said driving member.

7. A torsional vibration damper assembly for mounting in operative relation to the crankshaft of an internal combustion engine comprising a generally annular driving member adapted for concentric attachment to a crankshaft and having a radially outwardly extending flange terminating in a peripheral annular recess opening outwardly, a first driven inertia member annular in configuration and mounted concentrically of said driving member, said inertia member having a portion extending into said peripheral recess of said driving member, a first annular elastic element interposed between said driving and driven members prohibiting permanent displacement of the driven member with relation to the driving member, said first elastic element being generally U-shaped in cross section and lining said recess, said driven member having a surface thereon concentric with the axis of rotation of said driving member, a second driven inertia member mounted concentrically of said first driven member and having a central aperture therein accommodating said concentric surface of said first driven member, and a second annular elastic member interposed between said second driven member and said concentric surface of said first driven member preventing permanent displacement of said second driven member with relation to said first driven member, whereby the elastic system formed by each driven member and each elastic element are series connected.

References Cited by the Examiner

UNITED STATES PATENTS 2,152,710   4/1939   Schwaiger _____ 74—574
2,594,555   4/1952   Hardy _____ 74—574

FRED C. MATTERN, JR., *Primary Examiner.*

W. S. RATLIFF, *Assistant Examiner.*